United States Patent [19]

Wolf et al.

[11] Patent Number: 4,855,373

[45] Date of Patent: Aug. 8, 1989

[54] MULTI-SITED HYDRAZONE INITIATORS OF VINYL POLYMERIZATION

[75] Inventors: Richard A. Wolf; John M. Warakomski, both of Midland, Mich.

[73] Assignee: The Dow Chemical Company, Midland, Mich.

[21] Appl. No.: 268,136

[22] Filed: Nov. 7, 1988

[51] Int. Cl.$^4$ ...................... C08F 4/04; C07C 109/16
[52] U.S. Cl. .................................. 526/218.1; 526/217; 564/251
[58] Field of Search ............................ 526/218.1, 217; 564/251

[56] References Cited

U.S. PATENT DOCUMENTS 2,478,066  8/1949  Van Peski ........................... 526/217
2,601,293  4/1950  Howard, Jr. ....................... 526/217

FOREIGN PATENT DOCUMENTS 50-49383  5/1975  Japan .

Primary Examiner—Joseph L. Schofer
Assistant Examiner—Alex H. Walker

[57] ABSTRACT

The invention comprises an improved process for polymerization of vinyl monomers using novel multi-sited hydrazone initiators. The hydrazones are especially useful for initiation of polymerization processes for preparation of branched and cross-linked vinyl.

8 Claims, No Drawings

MULTI-SITED HYDRAZONE INITIATORS OF VINYL POLYMERIZATION

FIELD OF THE INVENTION

The invention relates to processes for free-radical polymerization of vinyl monomers using multi-sited initiators.

BACKGROUND

Polymerization of vinyl monomers to prepare polyvinyl resins has been extensively research and practiced. Economic competition in the thermoplastic manufacturing industry has created a marketplace in which the consumer enjoys a plethora of plastic products, however, there exists an ever increasing demand for lower priced, quality products. The widespread commercial success of thermoplastic products prepared from polyvinyl resins has generated incentive to search for more efficient methods of preparation.

In order to improve commercial preparation of plastic products, efforts have been made to improve the polymerization processes which provide the feedstock polyvinyl resin for further processing. Various initiators and catalysts for polymerization have been taught.

Howard, U.S. Pat. No. 2,610,293 discloses hydrazone and peroxide catatlysis of the polymerization of vinyl monomers.

Van Peski, U.S. Pat. No. 2,478,066 discloses hydrazone as a polymerizatio promoter for vinyl monomers, the reaction taking place at high temperature under pressurized conditions.

Conventional polymerization processes require relatively high temperatures to first initiate polymerization and then to provide for high rates of conversion of the monomeric unsaturate to the polymeric resin. Elevated temperatures degrade the resin thus adversely effecting the structural properties of the thermoplastic product.

In order to polymerize vinyl monomers at lower temperatures, azo and peroxide initiators have been utilized alone and in combination with other catalysts. A disadvantage to the commercial use of reactive chemicals such as peroxides and azo compounds is that they are hazardous to use and production costs increase accordingly. It would be highly desirable to be able to polymerize vinyl monomers under milder, safer and less costly reaction conditions.

There also exists a need in the industry to find more efficient methods for preparation of cross-linked and branched vinyl polymers. Branched vinyl polymers, sometimes referred to as starbranched polymers, are characterized by a number of linear polymeric chains joined at a central point. Long chain branching decreases the molecular dimensions of a branched polymer compared to the molecular dimensions of a linear polymer of the same molecular weight (MW). The more compact branched polymer is less viscous compared to the corresponding linear polymer. The less viscous branched polymers can be processed at desirably high rates at lower pressures and temperatures than the corresponding linear polymers of the same MW.

Molten branched polymeric resins have a higher melt flow rate than molten linear polymeric resins of comparable MW. Therefore, branch polymers are also desirably used for injection molding applications. The high flow rate at lower resin temperatures results in a shorter mold cycle time.

High MW branched polymers (greater than 100,000 MW) are more easily processed than high MW linear polymers due to decreased viscosity at a given MW. High MW polymers are used to prepare plastic products with a desirable amount of structural integrity, such as impact-resistance, tensile strength and toughness.

Many branched polymers are prepared using processes of polymerization which employ multi-sited anionic or cationic initiators. These processes are undesirably costly in that highly purified reactants are prerequisite and stringent polymerization conditions require the essential absence of oxygen and water vapor.

It would be desirable to have multi-sited initiators for free-radical polymerization processes which are carried out under less stringent and hence less costly conditions than are ionic polymerization processes.

Crivello et al., Polym. Bull. 16(2—3), 95—102 (1986) discloses a cyclic silyl pinocle ether for use in free-radical polymerization of vinyl monomers.

SUMMARY OF THE INVENTION

The present invention process provides for free-radical polymerization of vinyl monomers using movel multi-sited hydrazone initiators, which process is especially useful for preparing branched and crosslinked polyvinyls.

One broad aspect of the invention comprises a novel hydrazone of formula I:

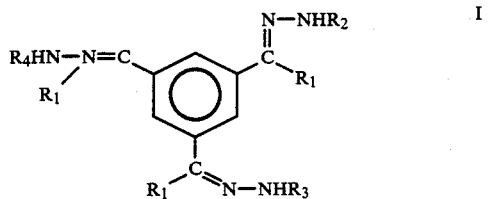

wherein:

$R_1$ =H or oan alkyl group having up to 22 carbons;

$R_2$, $R_3$ and $R_4$ are independently H or an aromatic or an aliphatic group having up to 22 carbons.

In another broad aspect of the invention a process for polymerization of vinyl monomers comprises contacting a monomer of Formula II with a hydrazone of Formula I:

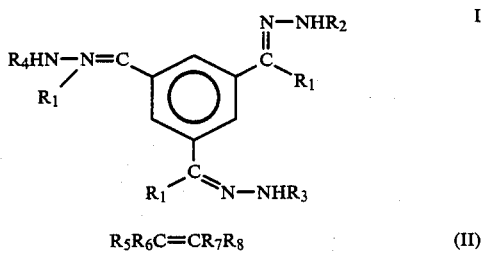

wherein:

$R_1$, $R_2$, $R_3$ and $R_4$ are as previously defined; and $R_5$, $R_6 R_7$ and $R_8$ are selected from the group consisting of H, - COOR$_1$, -C(R$_1$)$_2$, cyano, nitro, acetoxy, halo, alkylthio and an aromatic oro an aliphatic group having up to 22 carbons.

DETAILED DESCRIPTION

A preferred multi-sited hydrazone comprises the compound of Formula I:

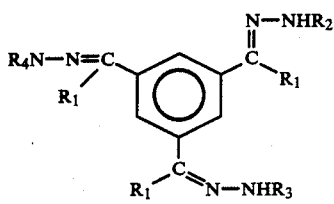

wherein:
- $R_1$ equals H or an alkyl group having up to 22 carbons; and
- $R_2$, $R_3$ and $R_4$ are independently H or a substituted aromatic or a substitued aliphatic group having up to 22 carbons, each having at least one substituent selected from the group consisting of cyano, amino, hydroxy, phenoxy and nitro.

More preferably, a hydrazone of Formula I comprises a compound wherein $R_1$ equals H or an alkyl group having up to 22 caronbs; and $R_2$, $R_3$ and $R_4$ are independently tertiary alkyl having up to 8 carbons. Most preferably, the hydrazone of formula I comprises benzene, 1,3,5-tris(acetyl t-butylhydrazone).

Most preferably, the vinyl monomer is selected from the group consisting of acrylic acid, acrylamide and $C_{1-4}$ alkyl esters of acrylic acid.

The hydrazone initiator is preferably present at about 0.01 to about 50 mole percent relative to the vinyl monomer, preferably from about 0.01 to about 5 mole percent and more preferably from about 0.1 and about 2 mole percent. The polymerization may be conducted in mass, solution, emulsion, suspension or any combination thereof.

The polymerization may proceed at temperatures ranging from subambient up to temperatures above the boiling points of the monomer, solvent, suspending agent, or emulsifying agent, in which case the polymerization would be conducted under pressures higher than ambient pressures. The temperature range of the polymerization reaction comprises temperatures from about $-10°C$. to about $250°C$., preferably from about $0°C$. to about $90°C$., more preferably from about $15°C$. to about $50°C$..

The polymerization may proceed at pressure ranges from subatmospheric to about 5000 pounds per square inch gauge (psig) (34,475 kiloPascals gauge (kPag)). Preferably, the pressure range is from abou 1.5 psig (10 kPag) to abou 1000 psig (6875 kPag); more preferably, from about 3 psig (20 kPag) to about 150 psig (1000 kPag); and most preferably, from about 15 psig (104 kPag) to about 30 psig (207 kPag).

The polymerization may occur in the presence or absence of dissolved oxygen, although removal of oxygen is preferred. The polymerization may occur in the presence of standard free radical inhibitors, such as phenols, transition metals, quinones, nitroaromatics, aryl amines and sulphur, depending on the molar ratio of hydrazone to inhibitor. Preferably the ratio of hydrazone to such inhibitors is greater than one.

Multi-sited radical initiators can result in crosslinking or branching, depending on the mode of termination of the polymerization. Termination of the polymerization by disproportionation will result in a branched polymer. Termination of the polymerization by recombination of reacting species will result in a crosslinked polymer. In a given polymerization, both modes of termination may occur.

The following examples are illustrative of processes for polymerization of vinyl monomers, initiated by the hydrazones of the present invention.

EXAMPLE 1

Preparation of Benzene 1,3,5-Tris(Acetyl t-Butylhydrazone)

A mixture of 1,3,5-triacetylbenzene (20.42 grams (g), 0.100 mole), t-butylhydrazine hydrochloride (39.87) g, 0.320 mole), 50 percent by weight aqueous sodium hydroxide (24.70 g 0.309 mole) and 80 milliliters (ml) of absolute ethanol was heated to reflex for 17.25 hours. To the cooled reaction mixture, 111 ml of methylene chloride was added and the resultant slurry was stirred for 45 minutes at ambient temperature. The orange supernatant was decanted and the methylene chloride and ethanol were removed by rotary evaporation to leave yellow wet solids. The solids were dissolved in a mixture of 300 ml of methylene chloride and 150 ml water. After mixing, the methylene chloride layer was separated from the aqueous layer using a separatory funnel and the aqueous layer was washed with 100 ml of fresh methylene chloride. The combine methylene chloride layers were dried with anhydrous sodium sulfate. After filtering, the methylene chloride was removed by rotary evaporation, to leave yellow solids which were dried at $30°C$. to $40°C$. for 40 minutes in a high vacuum oven. This yielded 39.75 g of yellow-orange solids. Spectrophotometric analysis was consistent with the desired product.

EXAMPLE 2

Large Scale Polymerization of Aqueous Acrylic Acid Using Benzene 1,3,5-Tris (Acetyl t-Butylhydrazone) (BTABH)

An aqueous solution of 25.18 g of acrylic acid with 0.75 weight percent trimethylolpropanetriacetate (TMPTA) and 72.82 g water was prepared and sparged with nitrogen for one hour with stirring. To this solution, at ambient temperature, was added a solution of 0.49 g BTABH in 3 ml of acetone (0.34 mole percent of BTABH, based on acrylic acid). Within 30 seconds after addition of the BTABH/acetone solution (13.9 weight percent), a yellow gel formed. The reaction flask was allowed to stand at ambient temperature overnight.

A portion of the wet product gel was shaken with 500 g of 0.9 percent aqueous sodium chloride for four hours. The resulting slurry was douobly filtered, through 100 mesh hylon and size #3 Whatman filter paper under suction. The collected filtrate was anlayzed for acrylic acid content using liquid chromatography techniques. A Whatman Partisil 10 ODS-2 chromatography column was employed, with 0.02 N $H_2SO_4$ as a carrier solution. The percent acrylic acid detected in the gel was 96.8 percent. The wet product gel was ground in a blender and neutralized with 55.50 g of 15 percent by weight of aqueous sodium carbonate and then mixed by kneading. The resulting mixture was dried in a vacuum oven at $100°C$. for 22 hours. The solids were ground in a blender and sieved through a 20-100 mesh filter. The free swell capacity of the polymer powder in 0.9 percent aqueous sodium chloride was measured to be 43.1 g solution/g polymer.

EXAMPLE 3 Polymerization of Aqueous Acrylic Acid, Using Benzene 1,3,5-Tris(Acetyl t-Butylhydrazone)

An aqueous acrylic acid solution (10 g)(10% by weight) containing 0.75% by weight TMPTA, based on acrylic acid was mixed in a test tube. Without nitrogen sparging, a solution of 7.0 mg of benzene 1,3,5-tris(acetyl t-butylhydrazone) (BTABH) in one ml acetone (0.12 mole percent BTABH, based on acrylic acid) was added to the test tube. After two minutes at ambient temperature, no gel had formed. Nitrogen sparing was begun, and within two minutes a polymeric gel formed in the test tube. The process was conducted at ambient temperature.

What is claimed is:

1. A compound for initiation of vinyl polymerization comprising a hydrazone of Formula I:

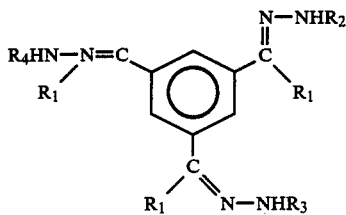

wherein:
$R_1 =$ H or an alkyl group having up to 22 carbons;
$R_2$, $R_3$ and $R_4$ are independently H or an aromatic or an aliphatic group having up to 22 carbons.

2. The compound of claim 1 comprising the hydrazone of Formula I wherein:
$R_1$ equals H or an alkyl group having up to 22 carbons;
and $R_2$, $R_3$ and $R_4$ are independently H or a substituted aromatic or a substituted aliphatic group having up to 22 carbons, each having at least one substituent selected from the group consisting of cyano, amino, hydroxy, phenoxy and nitro.

3. The compound of claim 1 comprising the hydrazone of Formula I wherein:
$R_1$ equals H or an alkyl group having up to 22 carbons; and
$R_2$, $R_3$ and $R_4$ are independently tertiary alkyl.

4. The compound of claim 1 wherein the hydrazone comprises benzene 1,3,5-tris(acetyl t-butylhydrazone).

5. A process for polymerization of vinyl monomers comprising contacting a monomer of Formula II with a hydrazone of Formula I:
wherein:
$R_1 =$ H or an alkyl group having up to 22 carbons;
$R_2$, $R_3$ and $R_4$ are independently H, or an aromatic or an aliphatic group having up to 22 carbons; and
$R_5$, $R_6$, $R_7$ and $R_8$ are selected from the group consisting of H, —COOR$_1$, —CO(R$_1$)$_2$, cyano, nitro, acetoxy, halo, alkylthio and an aromatic or an aliphatic group having up to 22 carbons.

6. The process of of claim 5 wherein the hydrazone comprises a compound of formula I wherein:
$R_1 =$ H or an alkyl group having up to 22 carbons;
$R_2$, $R_3$ and $R_4$ are independently H or a substituted aromatic or a substituted aliphatic group having up to 22 carbons, each having at least one substituent selected from the group consisting of cyano, amino, hydroxy, phenoxy and nitro.

7. The process of claim 5 wherein the vinyl monomer comprises a compound of Formula II wherein:
$R_5$ selected from the group consisting of —COOR$_1$, —CON(R$_1$)$_2$, cyano and phenyl; and
$R_6$, $R_7$ and $R_8$ are all hydrogens.

8. The process of claim 5 wherein the vinyl monomer is selected from the group consisting of acrylic acid, $C_{1-4}$ alkyl esters of acrylic acid and acrylamide.

* * * * *

UNITED STATES PATENT AND TRADEMARK OFFICE
CERTIFICATE OF CORRECTION

PATENT NO. : 4,855,373

DATED : August 8, 1989

INVENTOR(S) : Richard A. Wolf and John M. Warakomski

It is certified that error appears in the above-identified patent and that said Letters Patent is hereby corrected as shown below:

Column 1, line 12, "research" should correctly appear as --researched--.

Column 1, line 30, "polymerizatio" should correctly appear as --polymerization--.

Column 2, line 44, "oan" should correctly appear as --an--.

Column 2, line 66, "$-C(R_1)_2$," should correctly appear as -- $-CON(R_1)_2$,--.

Column 2, line 67, "oro" should correctly appear as --or--.

Column 3, line 24, "caronbs;" should correctly appear as --carbons;--.

Column 3, line 52, "abou" should correctly appear as --about--.

Column 3, line 53, "abou" should correctly appear as --about--.

Column 4, line 55, "douobly" should correctly appear as --doubly--.

Column 4, line 56, "hylon" should correctly appear as --nylon--.

UNITED STATES PATENT AND TRADEMARK OFFICE
CERTIFICATE OF CORRECTION

PATENT NO. : 4,855,373

DATED : August 8, 1989

INVENTOR(S) : Richard A. Wolf and John M. Warakomski

It is certified that error appears in the above-identified patent and that said Letters Patent is hereby corrected as shown below:

Column 5, line 4, EXAMPLE 3 should correctly appear centered over the title of Polymerization of Aqueous Acrylic Acid, Using Benzene 1,3,5-Tris (Acetyl t-Butylhydrazone).

Column 6, line 15, insert after "I:",

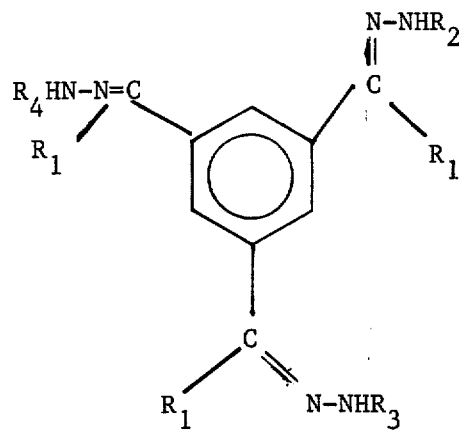

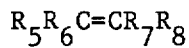

I            II

UNITED STATES PATENT AND TRADEMARK OFFICE
CERTIFICATE OF CORRECTION

PATENT NO. : 4,855,373

DATED : August 8, 1989

INVENTOR(S) : Richard A. Wolf and John M. Warakomski

It is certified that error appears in the above-identified patent and that said Letters Patent is hereby corrected as shown below:

Column 6, line 21, "$-CO(R_1)_2$," should correctly appear as -- $-CON(R_1)_2$, --.

Signed and Sealed this

Fourteenth Day of August, 1990

*Attest:*

HARRY F. MANBECK, JR.

*Attesting Officer*     *Commissioner of Patents and Trademarks*